July 8, 1941.                W. T. SAGNER                 2,248,202
                COMBINED TYPEWRITING AND COMPUTING MACHINE
                     Filed June 30, 1938      4 Sheets-Sheet 2
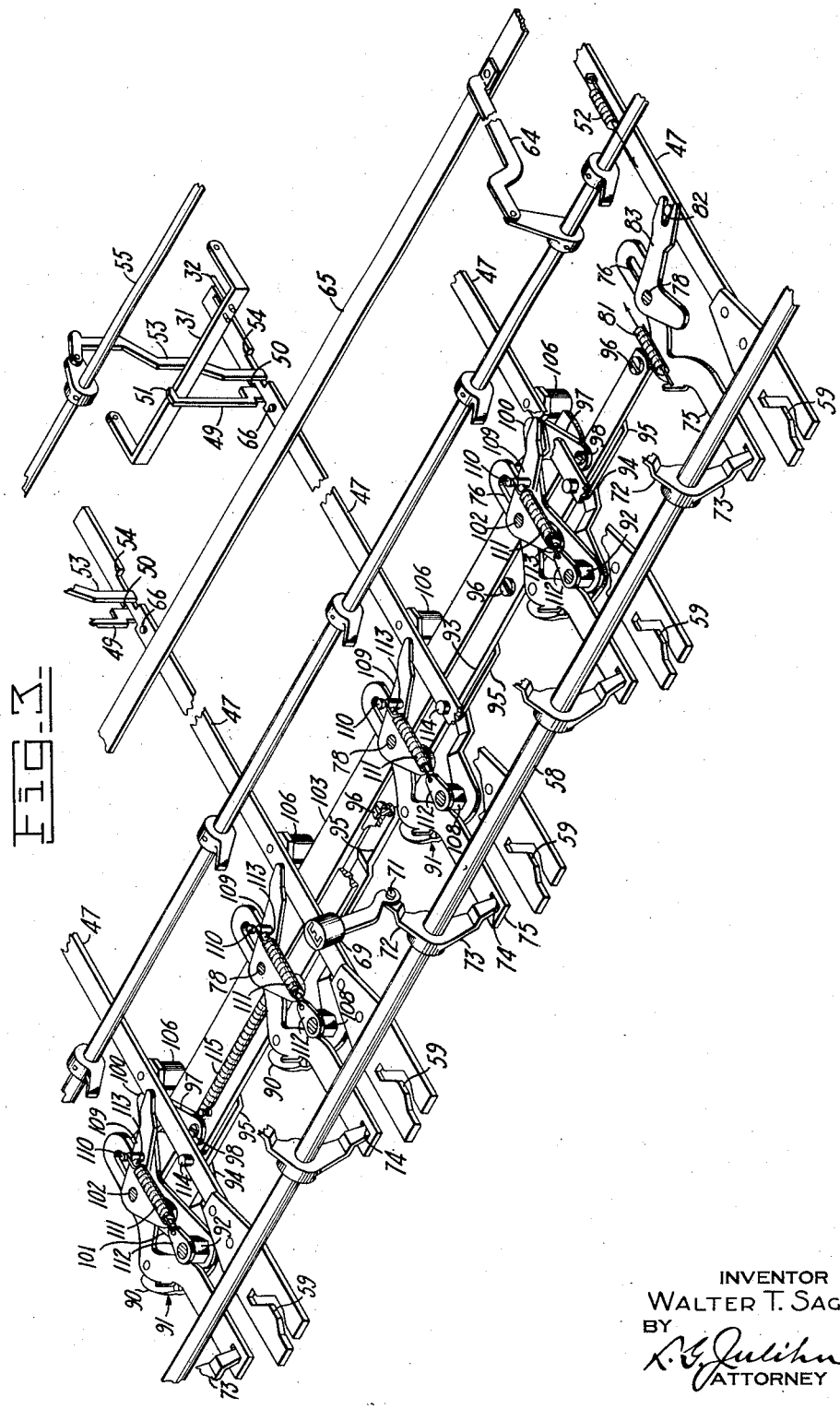
INVENTOR
WALTER T. SAGNER
BY
ATTORNEY

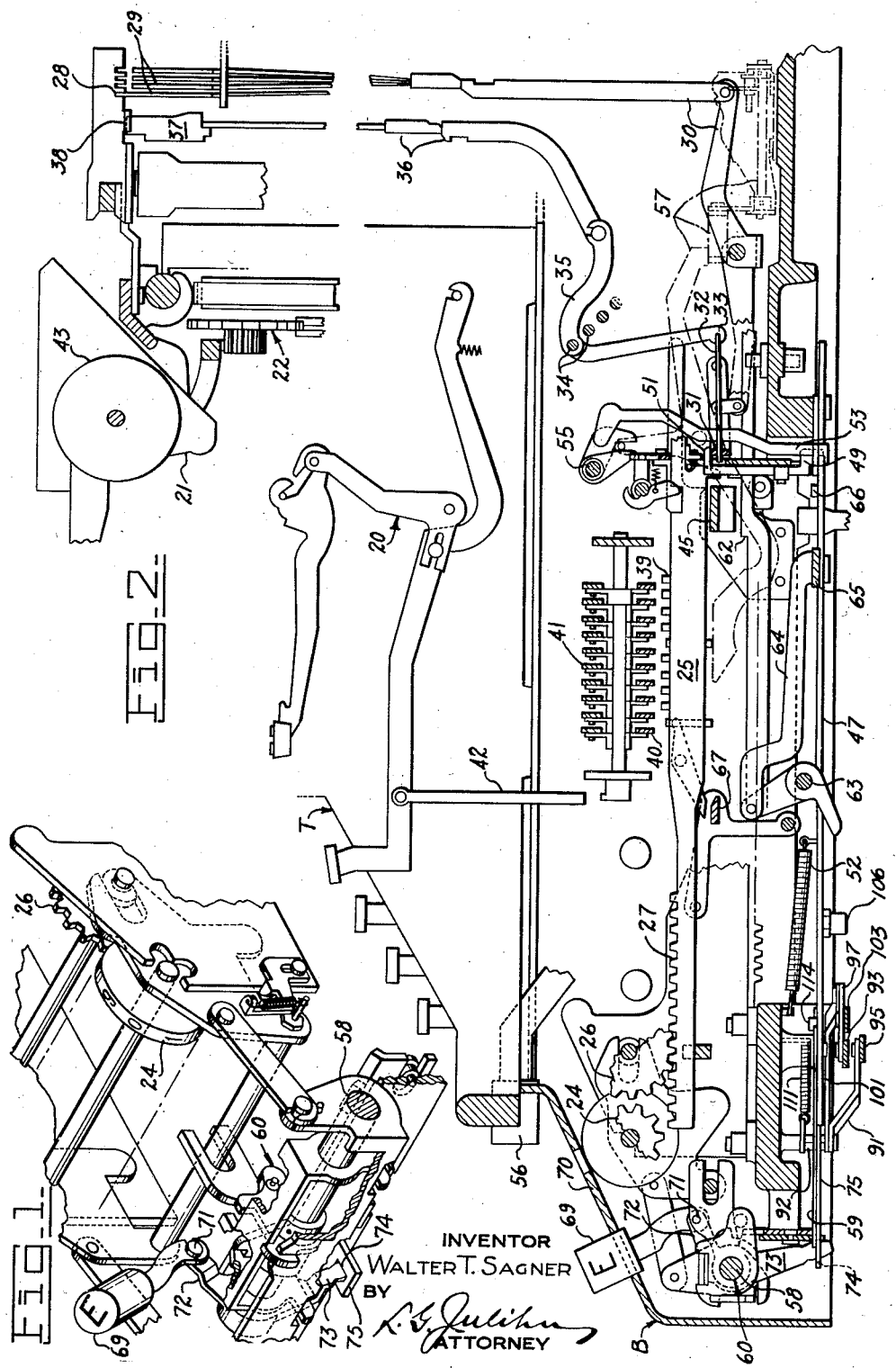

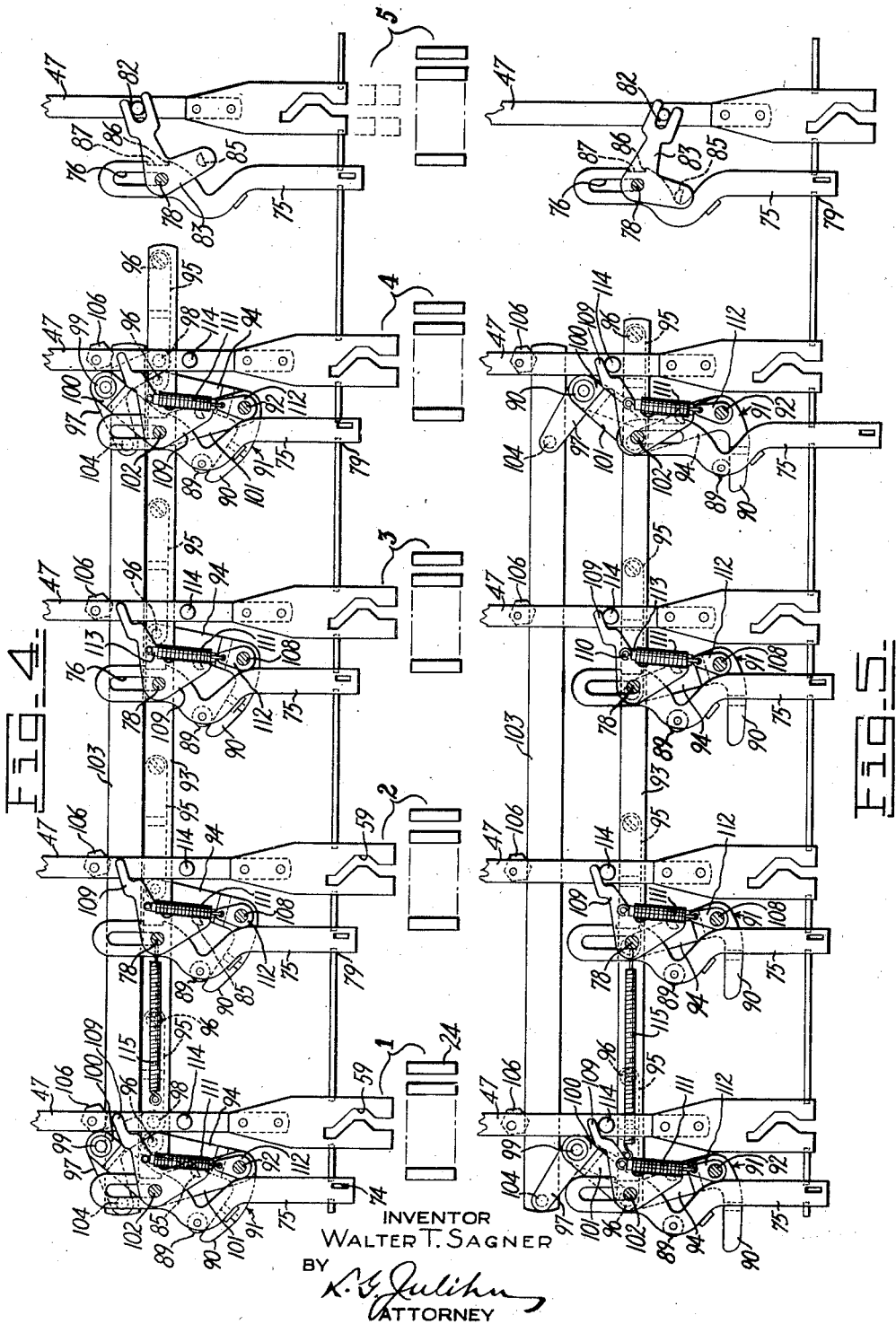

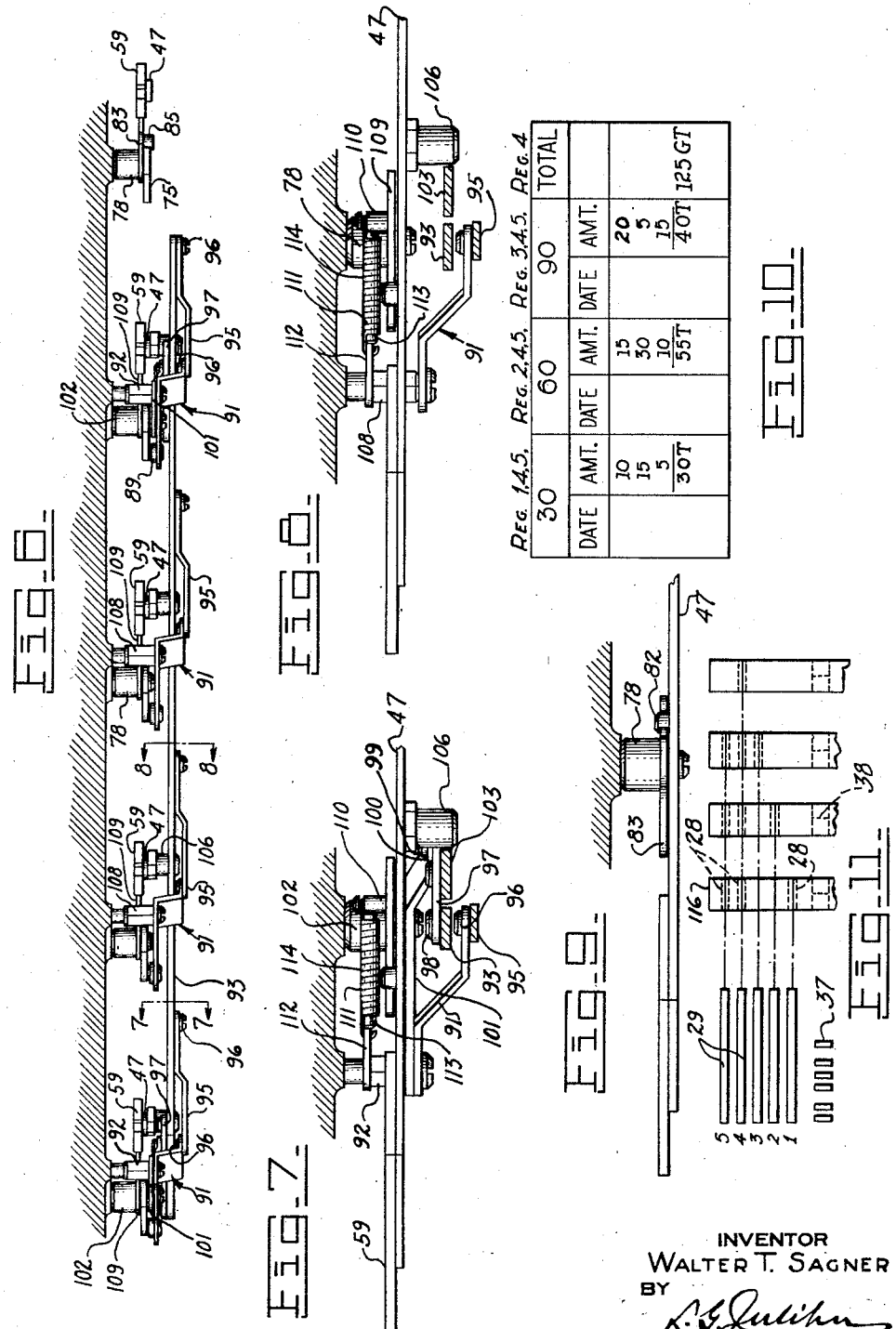

Patented July 8, 1941

2,248,202

UNITED STATES PATENT OFFICE 2,248,202

COMBINED TYPEWRITING AND COMPUTING MACHINE

Walter T. Sagner, West Hartford, Conn., assignor to Underwood Elliott Fisher Company, New York, N. Y., a corporation of Delaware Application June 30, 1938, Serial No. 216,781

1 Claim. (Cl. 235—60)

This invention relates to combined typewriting and multiple register computing machines and is herein illustrated with reference to a machine of the class exemplified in United States Patent No. 2,118,860 to H. L. Pitman.

In such machine, a typing carriage effects, at different computing zone positions, selective settings of state controllers of which there is one provided for each of the several registers. Each state controller is normally in neutral position from which it is individually settable under control of the carriage to an effective position to determine computation of an amount in the associate register, in accordance with typing said amount on a work-sheet.

A plurality of elimination or throw-off keys, one for each register and its state controller, is provided in said machine whereby at any computing zone of the carriage the carriage controlled settings of the state controllers may be suppressed or restored selectively with respect to the several registers.

In certain methods of computing, a subtotal register and one or more other registers are selected at each computing zone of the carriage. The same register serves for the subtotal at each of several computing zones. The machine is so arranged that when a subtotal is taken for a zone and the subtotal register is cleared by a subtraction operation, not only is the state controller for the subtotal register set but one or more other state controllers are also set since the carriage invariably effects the setting of all the state controllers as predetermined for that zone. It has been necessary, therefore, when taking a subtotal, to operate the throw-off keys discriminately so as to restore or suppress all the state controllers except the one associated with the subtotal register. Since different combinations of state controllers are selected and set by means of the carriage at the different computing zones, it has been necessary to operate different throw-off keys at the several computing zones and particular care has been necessary in order to make certain that the appropriate throw-off keys are operated when taking a subtotal at any zone.

It is an object of the invention to provide for substantially reducing the care required for suppressing or restoring the appropriate state controllers when it is desired to leave only a particular state controller effective even though one or more other state controllers were set by means of the carriage at a computing zone.

All of the throw-off keys for the several registers may be retained; and it is a feature of the invention that any one of said keys except the one associated with a particular state controller is operable to suppress or restore universally all but said particular state controller.

The several throw-off keys are disposed in a row across the machine. Thus, in a five register machine, there would be five throw-off keys, each operable relatively to its individual register and state controller. The register associated with the last key in the row may be the one that invariably is to be selected at any computing zone. But, according to the invention, the operation of any one of the other keys would suppress or restore all the state controllers associated with said other keys.

By retaining all of the throw-off keys, the invention may be applied to existing machines without unduly entailing changes in structure. Further, by retaining all of the throw-off keys, the aspect of the machine will not be confusing to an operator who is accustomed to working on a machine having a plurality of throw-off keys not associated with the present invention. It will be understood, however, that if desired all but one of the universal throw-off keys may be eliminated.

Other features and advantages will hereinafter appear.

Figure 1 is a perspective showing the state controller and throw-off key connections for one of the registers.

Figure 2 is a cross sectional side view of the combined typewriting and computing machine.

Figure 3 is a perspective of the state controllers and the universal throw-off key mechanism.

Figure 4 is a plan view of the universal throw-off key mechanism with the parts in normal positions.

Figure 5 is a plan view of the universal throw-off key mechanism showing the parts operated to restore the several state controllers.

Figure 6 is a view from the front of the machine showing the universal throw-off key connections in elevation.

Figure 7 is a sectional side view on the trace 7—7, Figure 6, showing part of the universal throw-off key connections.

Figure 8 is a section side view showing a part of the connections between the traces 7—7 and 8—8 of Figure 6.

Figure 9 is a side view of the state controller and connections that are operable independently of the universal throw-off key mechanism.

Figure 10 is a work-sheet form illustrative of the utility of the invention.

Figure 11 is a diagram of the set up of the carriage tappets for the Figure 10 work-sheet.

A typewriter T, including numeral type actions 20, carriage 21, and letter feed mechanism 22, surmounts a computing base B containing side by side a plurality of registers or sets of computing wheels 24. Figure 1 represents one of the several registers. Individual sets of register bars 25, and sets of idlers 26 are associated with the several registers, and each set of wheels 24 normally stands disengaged from its register bar racks 27 and its idlers 26 as in Figure 2.

As the carriage enters a computing zone one or more register selecting tappets 28, provided on the carriage for that zone, engage and depress corresponding ones of cam plates 29. Each cam plate 29 works through a train 30 to elevate a bail 31 to lift the forward ends of bail-guided couplers 32 into operative connection with the rear ends of a corresponding set of the register bars 25. There is a cam plate 29, train 30, bail 31, and set of couplers 32 for each register. The couplers 32 of like denominations in the several sets are connected at 33 to corresponding denominational rock shafts 34 extending across the machine to ramify to the several sets of register bars by way of the couplers 32. A single set of master arms 35 on the rock shafts 34 has connections 36 to a single set of denominational jacks 37.

As the carriage advances through a computing zone at operation of the numeral type actions 20, a denomination selecting tappet 38 provided for that zone on the carriage depresses the jacks 37 seriatim, thereby to rock the shafts 34 seriatim and correspondingly thrust the couplers 32 forward. The jacks 37 when thus operated seriatim operate, through any set of couplers 32 that has been raised to operative position by means of its cam plate 29, to slightly advance the register bars of the corresponding set seriatim. By such slight advance of any register bar, its depressible index pins 39 are brought under pin-setting bars 40 of linkages 41 and operable by rods 42 pendent from the numeral type actions 20. Thus, at operation of the numeral type actions to type an amount against a platen 43, corresponding pins 39 are depressed in the register bars 25 of each set for which the couplers 32 have been raised by means of the register selecting tappet 28 and cam plate 29.

After the last digit of an amount has been typed and indexed, a cross bar 45 of a cycling general operator is reciprocated to drive the selected register bars through the depressed pins 39.

Each register has a state controller comprising a bar 47 slidably supported for endwise movement. A latch bolt 49 normally engages each state controller 47 at 50 to keep it releasably in neutral position and is connected at 51 to the corresponding coupler bail 31, there being an individual latch bolt 49 for each state controller. When any bail 31 is lifted, under control of the carriage, to select is register, the bolt 49 is lifted clear of the state controller 47 and therefore the latter, urged by spring 52, moves forward to an addition determining position against another latch bolt 53 normally positioned to intercept a shoulder 54 of the state controller. Should said other bolt 53 also be lifted clear of the state controller 47, the latter will move farther forward to a suitably determined subtraction position. The several latch bolts 53 are connected to a rock shaft 55 having operative connection, not shown, to a subtraction key 56, Figure 2, so that at rearward operation of the latter, all of the bolts 53 are lifted clear of their respective state controllers 47. Said subtraction rock shaft 55 also may be operated automatically, under control of the carriage at a computing zone, through connections 57 shown in dot and dash outlines, Figure 2.

The general operator mechanism also includes a rock shaft 58 timed to rock clockwise of Figure 2 to throw any selected set of computing wheels 24 into mesh before the general operator cross bar 45 picks up and advances any register bar 25, said rock shaft being also timed to rock counter-clockwise of Figure 2 to throw the computing wheels out of mesh before the returning cross bar 45 restores the advanced register bars. Each state controller 47 by its partial movement, to the latch bolt 53, or by its full movement, should said bolt 53 also be withdrawn, determines, respectively, that the rocking of said shaft 58 throws the computing wheels into mesh with the register bar racks 27 for addition, or into mesh with the idlers 26 for subtraction. For this purpose, a cam 59 on each state controller operates at the differential movements of the latter to differentially control coupling mechanism, generally indicated by the reference 60, Figures 1 and 2, between the computing wheels 24 and the rock shaft 58, there being one of such coupling mechanisms 60 for each register.

Near the end of its return stroke, the general operator cross bar 45 picks up and carries rearwardly a hook 62, Figure 2, operatively connected by a rock shaft 63 and links 64 to a restoring bar 65 and the latter is therefore carried rearwardly from the Figure 2 normal position to restore the advanced state controllers 47 by engaging their studs 66.

The general operator is not cycled until the carriage has left the computing zone and therefore has permitted the latch bolts 49 to drop again to reengage and hold the restored state controllers 47. The subtraction latch bolts 53 also drop back into normal positions. At the end of the cycle, the hook 62 is caused to be disengaged from the general operator cross bar 45, following the restoration of the state controllers, so that the restoring bar 65 is returned to its normal position, Figure 2, by a spring, not shown. The rock shaft 63 also serves to restore the set index pins 39 through pin restorers 67, Figure 2.

Figure 4 represents five registers or sets of computing wheels 42, and associate state control mechanisms, numbered from 1 to 5 inclusive.

Each state controller 47 has associated therewith a throw-off key 69 projecting above and guided in the front top 70 of the computing base casing, Figure 2. Each key 69 is connected at 71 to an arm 72 of a bell crank lever 73 supported by and rotatably loose on the rock shaft 58. Each lever 73 is connected as at 74 to a companion cam bar 75 having a slot 76 fitting a stud similar to 78 for the No. 5 register, in that it supports and guides said bar 75 at its rear for endwise movement, said bar 75 being also slidably supported by the frame-work at 79, Figure 4. Each bar 75 and the thereto connected lever 73 and throw-off key 69 are yieldably kept in normal position by a spring 81, said normal position being determined by abutment of the forward end of the cam bar slot 76 with said stud.

Referring to Figures 3, 4 and 5, the last state controller 47 at the right (for the No. 5 register) has a pin and slot connection 82 to a bell crank lever 83 fulcrumed on the stud 78. When said last state controller 47 is set (forwardly) to add position *a* or the subtraction position *b*, Figure 4, it will have turned said lever 83 clockwise so that a half round latch stud 85 thereon has been moved leftwardly and more into the path of a cam 86 on the bar 75 as in Figure 5. Depression of the throw-off key 69 associated with said last state controller 47 turns the lever 73 clockwise of Figure 3 and thereby draws the cam bar 75 forwardly so that the cam 86, engaging the half round stud 85 of the lever 83, will turn the latter counter-clockwise from the Figure 5 position and thus restore said last state controller 47 rearwardly to normal position. When the lever 83 completes its state controller restoring movement, its half round stud 85 is passed by and drops behind a latch shoulder 86 and against an edge 87 of the state controller, since the state controller spring 52 moves the state controller slightly forward and slightly turns the lever 83 clockwise as soon as said cam shoulder 87 passes forwardly of said half round stud 85. The forwardly moved cam bar 75 thus maintains the restoration and blocks or suppresses forward movement of said state controller 47.

At a subsequent cycle of the general operator, the state controller bar 65 moves the restored state controller slightly rearward, thereby slightly turning the lever 83 counterclockwise and thus withdrawing the half round stud 85 from the cam bar 75 with resultant restoration (rearward) of said cam bar 75 by its spring 81, the throw-off key 69 and intermediate lever 73 being restored along with said cam bar 75.

The mechanisms thus far described are substantially as set forth in the aforesaid Pitman patent to which reference may be had for further details. The mechanism embodying the present invention relating to throw-off key mechanism for restoring universally a plurality of state controllers will now be described; and, by way of example, the description is with reference to restoring any one or more of the several state controllers associated with the No. 1, 2, 3 and 4 registers, Figure 4. Any one of the throw-off keys 69 for these four registers may serve to restore or suppress universally any one or all of the state controllers for said four registers; and, preferably, instead of discarding all but any one of these four keys 69, they may all be retained. Each of the several cam bars 75 associated with these four keys 69 has a roller 89.

Considering the No. 4 register, for example when its cam bar 75 is drawn forwardly, Figure 5, by depressing the associate throw-off key 69, the cam bar roller 89, engaging an arm 90 of a bell crank lever 91, turns the latter counter-clockwise about a stud 92, thereby drawing leftward and endwise, from the Figure 4 position to the Figure 5 position, a cross-link 93, the latter being connected to an arm 94 of said bell crank lever 91 by a draw link 95, the latter having pivotal connections 96 to said arm 94 and link 93.

Said cross link 93 is supported by and connected to a pair of bell cranks 97 through headed pivots 98, Figures 4 and 7, and said bell cranks 97 are supported by and fulcrumed on headed pivots 99 on the under side of downwardly offset rear ends 100 of bracket plates 101. Each plate 101 is supported at one point by the stud 92 that fulcrums the bell crank lever 91 and at another point by a stud 102 adapted also to guide the cam bar 75 at its slot 76, there being also a bell crank 91, for the No. 1 register, connected by a draw link 95 to the cross link 93.

The pair of bell cranks 97, connected to the cross link 93, support a universal bar 103 through headed pivots 104. Thus, when the cross link 93 is moved endwise leftwardly from the Figure 4 to the Figure 5 position, it works through said bell cranks 97 to move the universal bar 103 edgewise rearwardly from the Figure 4 to the Figure 5 position and thereby restore or suppress any one or more of the state controllers for the Nos. 1, 2, 3 and 4 registers upon depressing either throw-off key 69 for the No. 1 and 4 registers, each state controller having a stud 106 through which it is engageable by said universal restoring bar 103. Either of the throw-off keys 69 for the No. 2 and 3 registers may also operate the universal bar 103 in that each of the cam bars 75 for these registers may have the roller 89 to operate a bell crank lever 91 connected by a draw link 95 to the cross link 93. Said bell crank levers 91 for the Nos. 2 and 3 registers are each fulcrumed on a stud 108 and the cam bars 75 for these registers are guided at their slots 76 by studs 78.

Each of the Nos. 1, 2, 3 and 4 state controllers 47 has associated therewith a bell crank 109 fulcrumed on the cam bar guiding stud (78 or 102) and overlying the associate cam bar 75 and presenting a half round stud 85. Each bell crank 109 has a stud 110 for a spring 111 anchored to a clip 112 on the stud (92 or 108). A stop rod 113 within said spring 111 cooperates with said stud and clip 112 to stop the bell crank 109 against clockwise rotation from the Figures 4, 5 normal position, but permits slight counter-clockwise rotation of said bell crank 109 so that upon depression of the throw-off key 69 and concomitant forward movement of the cam bar 75 the shoulder 86 of the latter may pass in front of and be latched by said half round stud 85. Said bell crank 109, for any one of the Nos. 1 to 4 registers, thus serves to latch the companion cam bar 75 in forward position and correspondingly serves to keep the companion bell crank lever 91, and the cross-link 93 and universal bar 103 in the state-controller restoring or suppressing positions, Figure 5. Upon cycling the general operator, all of the restored state controllers 47 are moved slightly rearward by the bar 65 and thereby slightly rock the bell cranks 109 counter-clockwise, each state controller having a bell-crank engaging stud 114. Thus, any one of the cam bars 75, for the Nos. 1 to 4 registers, that has been moved forwardly is released from the half round stud 85 whereupon said cam bar is restored rearwardly by its spring 81; and correspondingly the cross link 93, bell cranks 97 and universal bar 103 are restored to the normal positions, Figure 4, by a spring 115 acting on the cross link 93.

Figure 10 shows a work-sheet divided into columns for amounts and their subtotals relating to thirty, sixty and ninety day credit accounts.

The operation of the invention is exemplified in the posting of said accounts.

The amounts are posted and subtotaled in one column at a time, the usual carriage margin stops, not shown, being set to limit the carriage travel to one column; and the platen 43 is line spaced after each entry of an amount in said one column. After the posting and subtotaling for one column are finished, the margin stops are reset for determining the carriage travel for posting and subtotaling in another column.

The thirty-day amounts are entered in the No. 1 register for accumulating all the thirty days' amounts over an extended period and the thirty-day amounts are also entered in the No. 4 register which accumulates all the amounts in all the columns, and are also entered in the No. 5 register for accumulating a subtotal T of the thirty-day amounts for a period, say a day's posting, less than said extended period.

Similarly the amounts for the sixty-day column are entered in the Nos. 2, 4 and 5 registers and the ninety-day amounts are entered in the Nos. 3, 4 and 5 registers.

The same register, namely, the No. 5 register, is used for getting the subtotal T in any of the columns.

For each computing-zone column, the carriage is provided with a tappet unit 116, Figure 11, in which are placed the appropriate register selecting tappet or tappets 28 to depress the appropriate cam-plates 29 to lift the corresponding sets of couplers 32 into operative position and concomitantly to cause the corresponding state controllers 47 to be set from their normally neutral or restored positions. Each unit 116 has a denomination selecting tappet 38.

It will be obvious, Figure 11, that all the tappets 28, as set for a particular column, tend to be operative when a subtotal is to be taken for that column from the No. 5 register. Preparatory to subtotaling in the thirty-day column, for example, the state controllers 47 for the Nos. 1 and 4 registers must be restored or suppressed. Thus, in typing the thirty-day subtotal by copying it from the No. 5 register, the set of register bars 25 for that register will be indexed; but the sets of register bars for the Nos. 1 and 4 register will not be indexed because of the restoration or suppression of their respective state controllers 47. The No. 5 register having been indexed, the general operator is cycled to subtract the subtotal from and thereby clear said No. 5 register, the subtraction key 56 having first been set.

Similarly, preparatory to taking a sixty-day column subtotal or a ninety-day column subtotal, the state controllers for the Nos. 2 and 4 registers, or for the Nos. 3 and 4 registers are restored or suppressed, respectively.

It will be noted, now, that since the universal bar 103 is effective to restore any of the state controllers 47 for the Nos. 1, 2, 3 and 4 registers, there is eliminated the need for discriminating care in restoring the proper state controllers for each column, namely, the Nos. 1 and 4 controllers for the thirty-day column, or the Nos. 2 and 4 for the sixty-day column, or the Nos. 3 and 4 controllers for the ninety-day column. Any one of the throw-off keys 69 for the Nos. 1 to 4 registers will serve, through the universal bar 103, to restore or suppress whichever state controllers associated with these registers have been set for a particular column. At each cycle for clearing the subtotal register, No. 5, the universal throw-off key mechanism becomes restored automatically as hereinbefore explained.

For the last column, Figure 10, headed Total, the carriage only selects the No. 4 register by means of an appropriate tappet 28 as shown by the last unit 116 at the right of Figure 11. The grand total is typed from said No. 4 register and the latter's set of register bars 25 is concomitantly indexed. The general operator is then cycled to clear the No. 4 register by subtraction, the state controller for this register having been first set subtractively either by means of the subtraction key 56 or by means of a subtraction tappet on the carriage serving to release the subtraction latch-bolt 53 automatically through the connections 57.

Since any one of the throw-off keys 69, for the Nos. 1 to 4 registers, will serve to actuate the universal restoring bar 103 for the state controllers 47 for these registers, all but one of these keys 69 and the companion connections 75, 91, 109 etc. may be omitted if desired.

Variations may be resorted to within the scope of the invention, and portions of the improvements may be used without others.

What is claimed is:

In a multiple-register computing machine having a computing-zone-traversing carriage and a plurality of spring-urged laterally distributed state-controller bars, one for each register, selectively releasable under control of said carriage for resultant endwise movement; a restoring and suppressing mechanism for said state-controller bars comprising, in combination, a universal restorer extending transversely of and operatively connected to said bars, a cross-link, stationarily-fulcrumed bell cranks connecting said restorer and cross-link, a stationarily-fulcrumed lever operatively connected to said link and operable to move the link endwise to shift said restorer by means of said bell cranks to restore or suppress said state controller bars, a bar supported for endwise movement and operatively connected to said lever for operating the latter, said state-controller bars, restorer, link, bell cranks, lever and bar being disposed to work in substantially horizontal planes, and a downwardly depressible throw-off key having an operating connection to said lever-operating bar.

WALTER T. SAGNER.